Feb. 21, 1950     A. R. MANN     2,498,169
RODENT TRAP
Filed Oct. 30, 1946
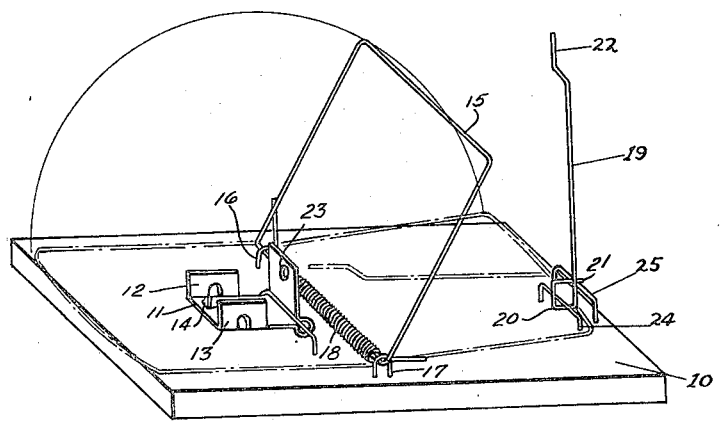
INVENTOR
Alexander Richard Mann
BY E. N. Fetherstonhaugh.
ATTORNEY Patented Feb. 21, 1950

2,498,169

UNITED STATES PATENT OFFICE 2,498,169

RODENT TRAP

Alexander R. Mann, Montreal, Quebec, Canada

Application October 30, 1946, Serial No. 706,590
In Canada November 7, 1945

1 Claim. (Cl. 43—81)

The invention relates to rodent traps as described in the present specification and illustrated in the accompanying drawing that forms a part of the same.

The invention consists essentially of the novel features of construction as pointed out broadly and specifically in the claim for novelty following a description containing an explanation in detail of an acceptable form of the invention.

The objects of the invention are to reduce the danger to the fingers of a hand while handling a set trap; to enable a person to set the trap without danger to his hand when the trap is accidentally set off; to eliminate the back lash of the spring bar of a trap when accidentally set off; to construct a rodent trap that will give a positive action, be economical to make and generally to provide a rodent trap that will be easy to manipulate and efficient for its purpose.

In the drawing the figure is a perspective view of the rodent trap.

Referring to the drawing, the rodent trap consists of the usual base 10, having the bait holder 11 pivotally secured thereto, the bait holder consisting of a strip of metal or equivalent material provided with side flanges 12 and 13 and a central lug 14 on which the bait is impaled and held in a fixed position by pressing down the central lug which is preferably made of pliable material, in that way holding the bait tightly and making it rather difficult for the rodent to extract the bait without setting off the trap.

The catch mechanism is formed of a U-shaped bar 15 and is hingedly secured to the loops 16 and 17 which are secured to the base 10 and the U-shaped bar is held under tension by means of the spring 18. The bar is set against the spring tension by means of the spring bar 19, this spring bar has one end twisted into a loop 20 and terminating into a tail portion 21, projecting horizontally slightly beyond the spring bar 19 while the other end of the spring bar is formed into a hook 22 for engagement with the receptacle 23 formed in the bait holder 11, the loop 20 engaging with a staple 24 secured in the base near the end of same. A secondary staple 25 is secured in the base near the holding staple 24 and being closer to the end of the base than that staple.

The formation of the spring bar is rather important because owing to this particular construction, after it has locked the U-shaped bar against the spring tension there is absolutely no danger of the person handling the trap being hurt through the accidental unsetting of the trap as the spring bar is prevented from back lashing against the hand owing to the fact that the loop and tail portion of the spring bar is brought into contact with the secondary staple 25.

What I claim is:

In a rodent trap, a base, a bait holder, a spring actuated catching mechanism pivoted to said base, a holding staple secured to said base near one end thereof, a secondary staple secured to said base and disposed adjacent the holding staple and closer to said end of the base, a spring bar having a loop at one end and encircling said holding staple and adapted to hold the said spring actuated catching mechanism against spring tension, and a tail member integral with the looped end of said spring bar and adapted to engage with said secondary staple when the trap is sprung and thereby prevent back lash of said spring bar.

ALEXANDER R. MANN.

REFERENCES CITED

The following references are of record in the file of this patent:

UNITED STATES PATENTS

| Number | Name | Date |
|---|---|---|
| 1,405,229 | Kopke | Jan. 31, 1922 |
| 1,464,559 | Britan | Aug. 14, 1923 |
| 1,948,199 | Booth | Feb. 20, 1934 |
| 2,225,254 | Bowen | Dec. 17, 1940 |